July 29, 1958 F. SCHWAB 2,844,968

MACHINE TOOL DRIVING ARRANGEMENT

Filed March 15, 1956

INVENTOR:
FRIEDRICH SCHWAB

BY: Michael S. Striker
agt.

United States Patent Office

2,844,968
Patented July 29, 1958

2,844,968

MACHINE TOOL DRIVING ARRANGEMENT

Friedrich Schwab, Stuttgart-Riedenberg, Germany

Application March 15, 1956, Serial No. 571,815

Claims priority, application Germany November 18, 1952

8 Claims. (Cl. 74—421)

The present invention relates to machine tools.

More particularly, the present invention relates to a driving arrangement for a machine tool.

This application is a continuation-in-part of copending application Serial No. 392,722, filed November 17, 1953, now Patent No. 2,738,691, and entitled Turret Heads.

One of the objects of the present invention is to provide a machine tool with a unit capable of driving a tool carrying element at a speed different from the speed of the drive spindle of the machine tool.

Another object of the present invention is to provide a machine tool with a driving unit capable of driving a tool carrying element with a speed greater than that of the drive spindle of the machine tool.

A further object of the present invention is to provide a machine tool with a drive unit capable of driving a tool carrying element at a speed less than that of the drive spindle of the machine tool.

An additional object of the present invention is to provide a machine tool with a driving unit capable of driving a tool carrying element at a speed different from that of the spindle of the machine tool, and capable of being quickly and easily connected to and removed from the machine tool.

Also, the objects of the present invention include the provision of a structure capable of accomplishing the above objects and at the same time being composed of simple and ruggedly constructed elements which are very reliable in operation.

With the above objects in view the present invention mainly consists of a driving arrangement for a machine tool, this driving arrangement including a support means and a hollow housing carried by the support means. A first shaft is supported for rotation about its axis in the hollow housing and extends beyond one end of the latter, this first shaft being adapted to be placed in driving engagement with a driving spindle of the machine tool. A second shaft is supported for rotation about its axis in the hollow housing and extends beyond an opposite end of the latter, this second shaft being adapted to be removably connected to a tool. A gear means is located in the housing and cooperates with the first and second shafts for driving the second shaft at a speed different from the first shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
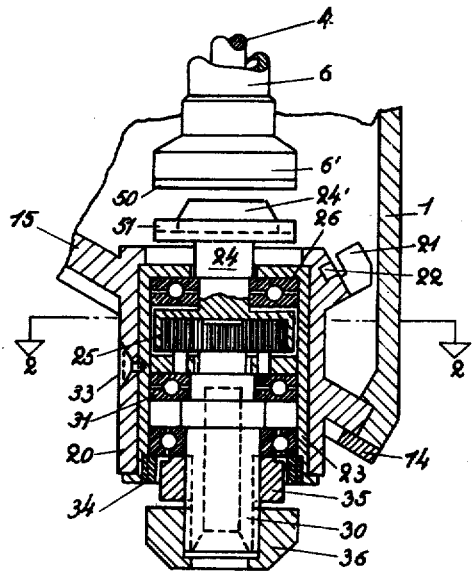
Fig. 1 is a fragmentary sectional elevational view showing one embodiment of a driving unit according to the present invention, this driving unit being shown in association with parts of a turret head which are fragmentarily illustrated.

Referring now to the drawings, and to Fig. 1 in particular, Fig. 1 shows fragmentarily a support 1 which forms a housing of a turret, this support 1 being shown in its entirety in the above-mentioned application Serial No. 392,722, now Patent No. 2,738,691. The support 1 is carried by the machine tool for movement together with the drive spindle 4, 6 of the machine tool. As is disclosed in the above-identified application, the spindle 4, 6 is adapted to move together with the turret housing 1 in order to transmit a drive to a tool. The urret housing 1 turnably supports a plate 15 which is provided with a plurality of cylindrical sockets 20 one of which is shown in Fig. 1, and elements 21 and 22 are connected to each socket for cooperating with a stop means for precisely locating each of the sockets of the turret in an operating position, as is fully described in the above-identified application. According to the present invention a drive unit of a particular construction is located in the socket 20 shown in Fig. 1. Ring 14 retains plate 15 on housing 1.

This drive unit which is located in the socket 20 is in the form of a hollow housing 23 which has a cylindrical configuration mating with that of the socket 20. As is apparent from Fig. 1, the cylindrical housing 23 is provided at its bottom end with an outwardly extending annular flange engaging the socket 20 and engages an inner shoulder of the latter at the top face of the housing 23 in order to limit the movement of the housing into the socket. A screw member 33 passes through an opening in a wall of the socket 20 and threadedly engages a threaded recess in a wall portion of the housing 23 in order to removably fix the latter within the socket 20.

A first shaft 24 is supported for rotation about its axis in the housing 23, this first shaft being shown in Fig. 1 as supported for rotation about its axis by the ball bearing 26 located within the housing 23. As is apparent from Fig. 1, the top wall of the housing 23 is formed with an opening through which the shaft 24 extends, and at its end which is located beyond the housing 23 the shaft 24 is provided with an end portion 24' adapted to mate with the portion 6' of the spindle part 6 which is connected to the spindle part 4 for rotation therewith and for axial movement therealong. At its bottom periphery the spindle part 6' is provided with clutch teeth 50 which are adapted to engage clutch teeth 51 of the shaft part 24' so that the spindle 4, 6 and shaft 24 are placed in driving engagement with each other when the clutch elements 50 and 51 engage each other. The manner in which the coaxial spindle 4, 6 and shaft 24 are placed in driving engagement with each other forms no part of the present invention and is fully disclosed in the above identified application.

A second shaft 30 is also supported for rotation about its axis in the housing 23, the bearings 31 and 32 being located in the housing and engaging the shaft 30 to support the latter for rotation about its axis. The shaft 30 is spaced coaxially from the shaft 24 and at the end of the shaft 30 which extends beyond the housing this shaft 30 threadedly carries a cap nut 36 for fixing a tool to the shaft 30. A ring 34 which is threaded at its outer surface is in threaded engagement with the bottom end portion of the housing 23 to retain the parts therein, and for the same purpose a nut 35 is in threaded engagement with the outer surface of the shaft 30.

Figure 2:
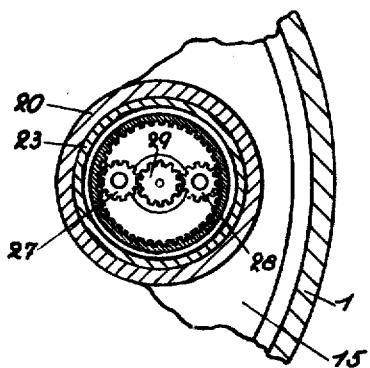
Fig. 2 is a sectional view taken along line 2—2 of Fig. 1 in the direction of the arrows.

In accordance with the present invention a gear means is located within the housing 23 and cooperates with the shafts 24 and 30 for driving the shaft 30 at a speed different from the shaft 24. In the embodiment which is shown in Fig. 1 as well as in Fig. 2 the shaft 24 has fixed coaxially thereto an internal ring gear 25, so that this ring gear 25 rotates with the shaft 24. A pinion 29 (Fig. 2) is fixed coaxially to the top end of the shaft 30 for rotation therewith and is located within the ring gear 25, as is evident from Fig. 1. Intermediate its ends the housing 23 carries a transverse wall formed with a central bore through which the shaft 30 freely passes and supporting for rotation about their axes, respectively, a pair of shafts fixed to a pair of gears 27 and 28, these gears being located at diametrally opposed parts of the pinion 29 and ring gear 25, and each of the gears meshes with the ring gear and the pinion, as is evident from Fig. 2. Thus, with the arrangement shown in Figs. 1 and 2, whenever the shaft 24 is driven the shaft 30 will be driven at a higher speed of rotation.

Figure 3:
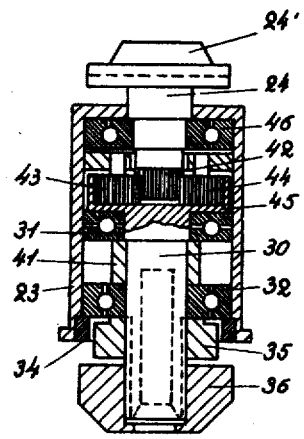
Fig. 3 is a sectional elevational view of a different embodiment of a driving unit according to the present invention.

Fig. 3 of the drawings shows another embodiment of the invention which may replace the driving unit carried by the housing 23 of Fig. 1 and which differs from the embodiment of Fig. 1 in that with the arrangement of Fig. 3 the shaft 30 will be driven at a slower speed than the shaft 24. As is apparent from Figs. 1 and 3, the elements of the unit of Figs. 3 are identical with that of Fig. 1 except for the gear means which cooperates with the shafts 24 and 30 and therefore all of these identical elements are indicated with the same reference characters. As may be seen from Fig. 3, the shaft 24 is supported for rotation about its axis in the housing 23 by the bearing 46, and a pinion 42 is fixed coaxially to the shaft 24 for rotation therewith. A ring gear 45 is fixed coaxially to the shaft 30 for rotation therewith, and this ring gear 45 surrounds the pinion 42. With the arrangement shown in Fig. 3 a spacer 41 surrounds the shaft 30 and is located between the barings 31 and 32. Furthermore the transverse wall of the housing 23 of Fig. 3 has the shaft 24 extending freely through its central aperture, and this transverse wall is located above the ring gear 45 rather than below the ring gear as in the embodiment of Fig. 1. This transverse wall supports a pair of gears 43 and 44 for rotation about their axes, and these axes of the gears are parallel to the common axis of the shafts 24 and 30. The gears 43 and 44 are located at diametrally opposed parts of the pinion 42 and each of the gears meshes with the internal ring gear 45 and with the pinion 42. Thus, with the arrangement shown in Fig. 3, it is evident that whenever the shaft 24 is driven the shaft 30 will be driven at a speed which is slower than that of the shaft 24, so that the unit of Fig. 1 may be replaced by that of Fig. 3 whenever it is desired to provide a step-down transmission rather than a step-up transmission. The housing 23 of Fig. 3 is adapted to be connected to the socket 20 by the screw means 33 in the same way as the housing 23 of Fig. 1.

Although the above described driving units of the present invention have been shown in connection with a turret head, it is emphasized that these driving units are not limited to use in a turret head and are of general applicability, it only being necessary to place these units in a machine tool with the shaft 24 coaxial with the driving spindle of the machine tool. Thus, instead of being used in a turret head, it is possible to use these driving units of the present invention in tapping machines as well as in machine tools which have quick-change chucks.

Figure 4:
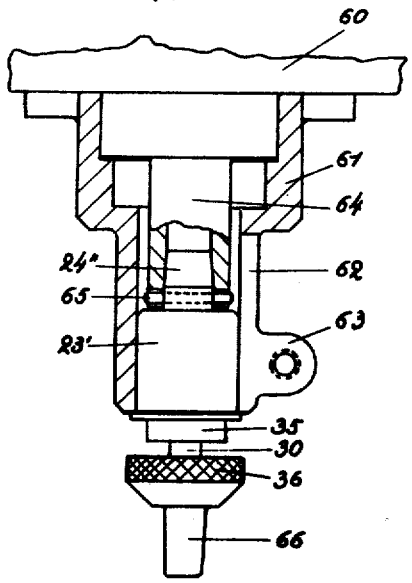
Fig. 4 shows a driving unit similar to that of Figs. 1 or 3 supported in another type of machine tool arrangement.

Fig. 4 illustrates the general applicability of the structure of the invention and shows one of the units of the invention with a different type of machine tool. Thus, referring to Fig. 4, the structure fragmentarily shown therein indicates a stationary support part 60 of a machine tool, this machine tool having a driving spindle 64 which rotates about its axis. A socket 61 is fixed to the support means 60 of the machine tool and surrounds the driving spindle 64 in the manner shown in Fig. 3. This socket 61 is open at its bottom end, and the elongated bottom end portion of the socket 61 is cylindrical and is formed with an axial slit 62 extending upwardly from the bottom end of the socket. This socket 61 also is provided with a pair of ears 63 integral with the socket and located at the opposite sides of the slit 62. These ears 63 are provided with a pair of bores, respectively, one of which is threaded, so that with a suitable screw member it is possible to draw the ears 63 together.

As is apparent from Fig. 4, the bottom end portion of the driving spindle 64, which is hollow, is provided with a pair of notches extending upwardly from the bottom face of the spindle 64. The housing 23' indicated in Fig. 3 is cylindrical and fits snugly within the cylindrical tubular portion of the socket 61. When the housing 23' is placed within the socket the upper free end portion of the shaft 24" which extends beyond the housing 23' moves into the hollow spindle 64, and a cross pin 65 which is fixed to the shaft 24" extends into the notches at the bottom end of the spindle 64, so that in this way the drive spindle 64 is placed in driving engagement with the shaft 24". This shaft 24" is identical with either of the shafts 24 described above except for the portion of the shaft 24" shown in Fig. 4. Furthermore the structure within and carried by the housing 23' is identical with either of the embodiments described above, and the housing 23' is itself identical with either of the above described housings 23. Once the housing 23 is thus placed within the socket 61, the ears 63 thereof are drawn together so as to tightly clamp the housing 23 within the socket, and it is evident that this arrangement permits the driving unit to be easily removed from the machine tool and exchanged for another driving unit. After the driving unit is thus connected to the machine tool, any suitable tool 66 may be placed in driving engagement with the shaft 30. Thus, it is evident that the driving units of the present invention may be used in machine tools of the all types.

It will be understood that each of the elements described above, or two or more together, may also find a useful application in other types of machine tools differing from the types described above.

While the invention has been illustrated and described as embodied in driving arrangements for machine tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a driving arrangement for a machine tool, in combination, support means having a cylindrical socket; a cylindrical housing located in said socket, engaging said support means at said socket thereof, and being removably connected to said socket; a first shaft supported for rotation about its axis in said housing and extending beyond one end thereof, said first shaft being adapted to be placed in driving engagement with a drive spindle of the machine tool; a second shaft spaced coaxially from said first shaft and supported in said housing for rotation about its axis, said second shaft extending beyond an opposite end of said housing and being adapted to be connected to a tool; and gear means in said housing cooperating with said first and second shafts for driving said second shaft at a speed different from said first shaft.

2. In a driving arrangement of a machine tool, in combination, support means having a tubular cylindrical socket; a cylindrical housing located in and engaging said socket; screw means carried by said socket and engaging said housing for removably connecting the latter to said socket; a first shaft supported for rotation about its axis in said housing and extending beyond one end thereof, said first shaft being adapted to be connected to a spindle of the machine tool; a second shaft spaced coaxially from said first shaft and supported for rotation about its axis in said housing, said second shaft extending beyond an opposite end of said housing and being adapted to be connected to a tool; and gear means in said housing cooperating with said first and second shafts for driving said second shaft at a speed different from said first shaft.

3. In a driving arrangement for a machine tool, in combination, support means; a hollow tubular cylindrical socket carried by said support means and having an open end, said socket being formed with a slit extending along the same from said open end thereof and having a pair of ears respectively located on opposite sides of said slit; a cylindrical housing located in said socket; screw means engaging said ears of said socket for pulling the same together to clamp said housing in said socket; a first shaft supported for rotation about its axis in said housing and extending beyond one end of the latter, said first shaft being adapted to be placed in driving engagement with a spindle of the machine tool; a second shaft supported for rotation about its axis in said housing and extending beyond an opposite end of said housing, said second shaft being adapted to be connected to a tool; and gear means in said housing cooperating with said first and second shaft for driving the latter at a speed different from said first shaft.

4. In a driving arrangement of a machine tool, in combination, support means having a cylindrical socket; a cylindrical housing carried by said support means in said socket thereof; means releasably fixing said housing to said support means in said socket thereof; a first shaft supported in said housing for rotation about its axis and extending beyond one end of said housing, said first shaft being adapted to be connected to a drive spindle of the machine tool to be driven thereby; a second shaft supported for rotation about its axis in said housing and extending beyond an opposite end of the latter, said second shaft being coaxially spaced from said first shaft and being adapted to be connected to a tool; an internal ring gear fixed coaxially to one of said shafts and located in said housing for rotation with said one shaft; a pinion fixed to the other of said shafts for rotation therewith and being coaxial with and located within said internal ring gear; and a pair of gears supported in said housing for rotation about axes respectively parallel to the common axis of said first and second shafts, said pair of gears meshing with said ring gear and said pinion.

5. In a driving arrangement of a machine tool, in combination, support means having a cylindrical socket; a cylindrical housing carried by said support means in said socket thereof; means releasably fixing said housing to said support means in said socket thereof; a first shaft supported in said housing for rotation about its axis and extending beyond one end of said housing, said first shaft being adapted to be connected to a drive spindle of the machine tool to be driven thereby; a second shaft supported for rotation about its axis in said housing and extending beyond an opposite end of the latter, said second shaft being coaxially spaced from said first shaft and being adapted to be connected to a tool; an internal ring gear fixed coaxially to one of said shafts and located in said housing for rotation with said one shaft; a pinion fixed to the other of said shafts for rotation therewith and being coaxial with and located within said internal ring gear; and a pair of gears supported in said housing for rotation about axes respectively parallel to the common axis of said first and second shafts, said pair of gears respectively meshing with diametrally opposed parts of said pinion and ring gear.

6. In a driving arrangement of a machine tool, in combination, support means having a cylindrical socket; a cylindrical housing carried by said support means in said socket thereof; means releasably fixing said housing to said support means in said socket thereof; a first shaft supported for rotation about its axis in said housing and extending beyond one end of the latter, said first shaft being adapted to be placed in driving engagement with a drive spindle of the machine tool; a second shaft spaced coaxially from said first shaft and also supported in said housing for rotation about its axis, said second shaft extending beyond an opposite end of said housing and being adapted to be connected to a tool; an internal ring gear fixed coaxially to said first shaft for rotation therewith and located in said housing; a pinion fixed coaxially to said second shaft for rotation therewith and located in said housing within said ring gear; and a pair of gears respectively carried by said housing for rotation about axes parallel to the common axis of said shafts and each meshing with said ring gear and said pinion.

7. In a driving arrangement of a machine tool, in combination, support means having a cylindrical socket; a cylindrical housing carried by said support means in said socket thereof; means releasably fixing said housing to said support means in said socket thereof; a first shaft supported in said housing for rotation about its axis and extending beyond one end of said housing, said first shaft being adapted to be placed in driving engagement with a drive spindle of the machine tool; a second shaft spaced coaxially from said first shaft and also supported for rotation about its axis in said housing, said second shaft extending beyond an opposite end of said housing and being adapted to be connected to a tool; an internal ring gear fixed coaxially to said second shaft for rotation therewith and located in said housing; a pinion fixed coaxially to said first shaft for rotation therewith and located in said housing within said ring gear; and a pair of gears supported in said housing for rotation about their axes, respectively, said axes of said ring gears being parallel to the common axis of said shafts, and each of said pair of gears meshing with said ring gear and said pinion.

8. A driving unit adapted to be used in a machine tool, comprising, in combination, a cylindrical housing having opposite open ends; a first shaft supported for rotation about its axis in said housing and extending beyond one end of the latter, said first shaft carrying at its end located outside of said housing a means for placing said first shaft in driving engagement with a drive spindle of the machine tool; a second shaft spaced coaxially from said first shaft and supported in said housing for rotation about its axis, said second shaft extending beyond an opposite end of said housing and carrying at its end outside of said housing a means for connecting said second shaft to a tool; and gear means in said housing cooperating with said shafts for driving said second shaft at a speed different from said first shaft.

References Cited in the file of this patent
UNITED STATES PATENTS

| 1,370,378 | Starr | Mar. 1, 1921 |
| 1,886,952 | Hodeaux | Nov. 8, 1932 |
| 2,065,486 | Albertson | Dec. 22, 1936 |
| 2,811,877 | De Groff | Nov. 5, 1957 |